(12) United States Patent
Paolucci et al.

(10) Patent No.: US 7,724,235 B2
(45) Date of Patent: May 25, 2010

(54) INPUT MECHANISM FOR FRONT PANEL OF PORTABLE COMPUTING DEVICE

(75) Inventors: Frederic Paolucci, Montpellier (FR); Yann Cheri, Montpellier (FR); Matthieu Baraban, Saint Jean de Vedas (FR); Thierry Escande, Montpellier (FR)

(73) Assignee: Palm, Inc., Sunnyvale, CA (US)

( * ) Notice: Subject to any disclaimer, the term of this patent is extended or adjusted under 35 U.S.C. 154(b) by 371 days.

(21) Appl. No.: 10/919,934

(22) Filed: Aug. 16, 2004

(65) Prior Publication Data

US 2005/0012711 A1 Jan. 20, 2005

Related U.S. Application Data

(63) Continuation of application No. 09/832,411, filed on Apr. 10, 2001, now Pat. No. 6,788,285.

(51) Int. Cl.
*G09G 5/00* (2006.01)

(52) U.S. Cl. .................. 345/156; 345/168; 345/173; 345/184; 200/6 R; 200/176; 341/20; 341/22; 463/37; 463/46

(58) Field of Classification Search .............. 345/156, 345/160, 161, 163, 167–169, 184, 901; 200/5 R, 200/5 E, 5 EA, 5 EB, 176–178, 6 R, 43.02, 200/43.04, 50.01, 50.24, 61.71, 61.72; 341/20, 341/22; 463/37, 64; 700/83–85, 17
See application file for complete search history.

(56) References Cited

U.S. PATENT DOCUMENTS

| 4,092,527 | A | * | 5/1978 | Luecke ................. 708/140 |
| 4,896,003 | A | * | 1/1990 | Hsieh .................. 200/6 A |
| 5,398,310 | A | * | 3/1995 | Tchao et al. ............. 715/541 |
| 5,865,546 | A | * | 2/1999 | Ganthier et al. .......... 400/489 |
| 6,118,436 | A | * | 9/2000 | Kushita ................ 345/173 |
| 6,215,419 | B1 | * | 4/2001 | Leman ................. 341/22 |
| 6,332,024 | B1 | * | 12/2001 | Inoue et al. .......... 379/433.06 |
| 6,573,843 | B1 | * | 6/2003 | Murphy ................ 341/22 |
| 6,727,890 | B2 | * | 4/2004 | Andres et al. ........... 345/168 |

* cited by examiner

*Primary Examiner*—Henry N Tran
(74) *Attorney, Agent, or Firm*—Mahamedi Paradice Kreisman LLP

(57) ABSTRACT

An embodiment of invention includes a handheld computer having a display. The display provides an output to a user-input. A housing includes a front panel that provides access to the display. A plurality of user-interactive mechanisms are provided on the housing. The user-input mechanisms include a first mechanism that is removably coupled to the housing.

7 Claims, 7 Drawing Sheets

INPUT MECHANISM FOR FRONT PANEL OF PORTABLE COMPUTING DEVICE

RELATED APPLICATIONS

This application is a continuation of U.S. patent application Ser. No. 09/832,411, filed Apr. 10, 2001, entitled "Portable Computer With Removable Input Mechanisms," now U.S. Pat. No. 6,788,285. The aforementioned priority application is hereby incorporated by reference for all purposes in its entirety.

BACKGROUND OF THE INVENTION

1. Field of the Invention

This invention relates to the field of handheld computers. In particular, the invention relates to input mechanisms for handheld computers.

2. Description of the Related Art

Handheld computers use buttons as one means for receiving user-input. In particular, personal digital assistants (PDAs) use application buttons for making selections and launching programs, and scroll buttons to scroll displayed output.

Typically, handheld computers such as PDAs operate core functions for maintaining calendars, to-do lists, phone books, memos and electronic scrap books. The buttons provided with handheld computers are often optimized to carry out the core functions. Sometimes the buttons are labeled with icons to indicate a certain purpose. They may also be assigned to certain applications. For example, a memo button may be used to launch the memo application.

Due to its popularity and advancements in processing resources, handheld computers are increasingly used for more diverse applications. The additional processing resources and expansion slots have provided users with a medium to add applications requiring more interaction, such as for example, games. For PDAs, users must play games using the same button configuration for operating the core functions. While previous core functions may require users to press the buttons sporadically, games may require prolonged and intense use of the buttons.

In general, the buttons on the handheld computer are integrated into the housing. If the buttons break, the user is required to open the handheld computer, and often must send the handheld computer away for repair. Often, it is easier for the user to replace the handheld computer rather than repair the buttons.

SUMMARY OF THE INVENTION

Embodiments of the invention include a removable or attachable set of user-input mechanisms for a handheld computer. The handheld computer may be configured to provide input mechanisms that are decoupleable from its housing. These user-input mechanisms may include buttons positioned on a surface of the handheld computer. Embodiments of the invention enable the buttons to be replaced with other buttons.

Alternatively, a set of the user-input mechanisms may be mounted over existing buttons and controls of the handheld computer. For example, attachable button sets may be provided on cartridges or other forms of housings. The cartridges may couple to a portion of the handheld computer's housing.

Among other advantages, the handheld computer and attachable button sets enable users to replace buttons on the handheld computer if they break. The user may also swap buttons on the handheld computer to operate an application on the handheld computer that requires intense button use, or is more suited for a different button configuration.

In addition, users may use analog controls with a handheld computer operated to receive digital user inputs. For example, a handheld computer may be coupled to a joy stick or joy pad having 8 possible directional movements.

With removable and attachable button sets, joy sticks and pads, users may be provided with the ability to optimize the controls on the handheld computer for different applications.

DETAILED DESCRIPTION

A. System Overview

Embodiments of the invention provide a removable set of input mechanisms for users to operate a handheld computer.

The removable set of input mechanisms may be replaced by other sets of input mechanisms. As a result, the versatility of the handheld computer is enhanced. In particular, the handheld computer may operate a diverse range of programs, and be equipped to provide input mechanisms that are better suited for select applications, as needed.

Other embodiments of the invention provide for an attachable device having one or more input mechanisms that may be overlaid onto an existing set of input mechanisms for a handheld computer. The attachable device may be used to alter the configuration of the existing input mechanisms, so as to match a preference of the user. In particular, certain configurations for input mechanisms may facilitate use of some applications. For example, a handheld computer may be operated with a game, and an attachable button set may place buttons in proximity one another to enable the user to play the game better.

B. Handheld Computer With Removable Input Mechanisms

Figure 1:
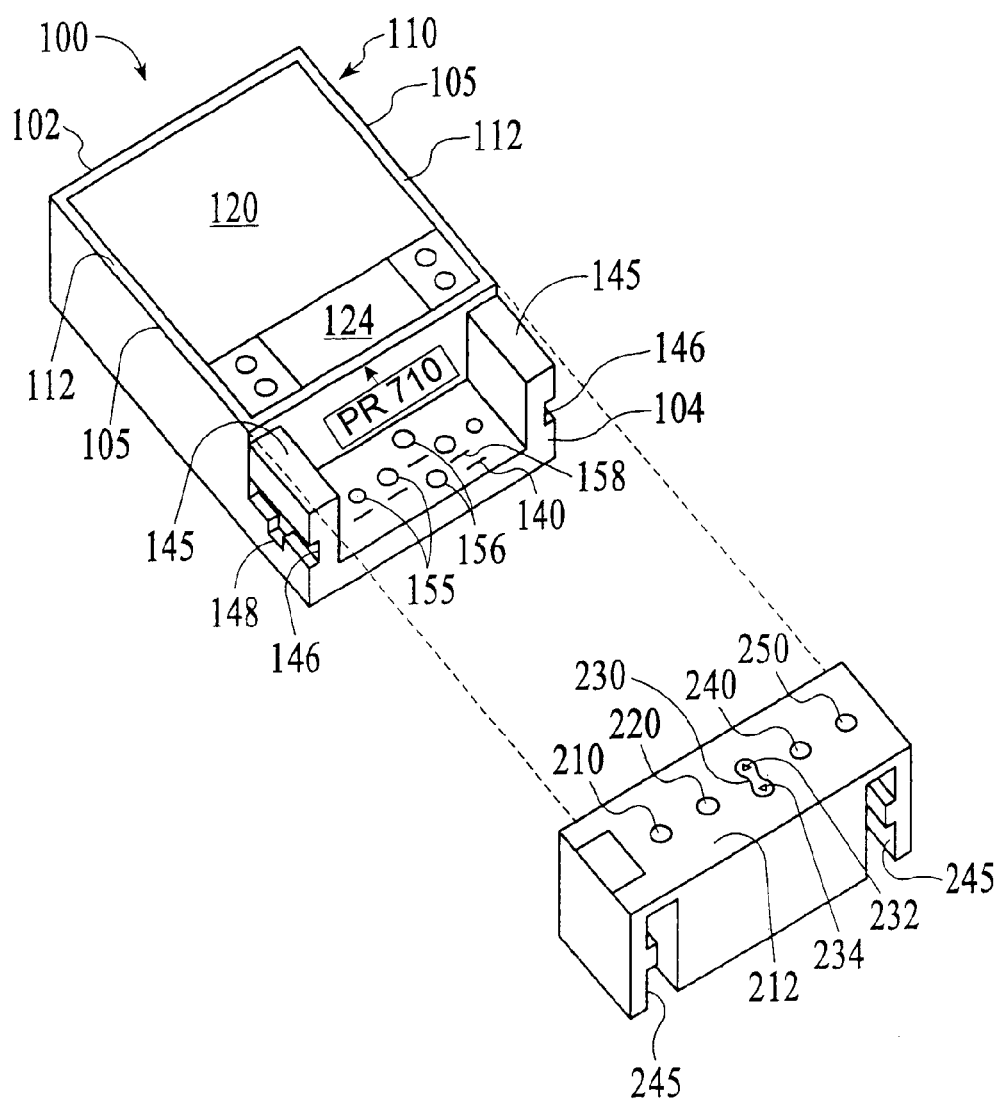
FIG. 1 is a front isometric view of a handheld computer being combined with a removable attachment carrying a set of user-input mechanisms, under an embodiment of the invention.

FIG. 1 illustrates a handheld computer 100 configured to receive a removable attachment 200 having a plurality of input mechanisms, under an embodiment of the invention. The handheld computer 100 includes a housing 110. A display 120 is provided on a front panel 112 of housing 110. A portion of display 120 includes a display input area 124. The display input area 124 includes a handwriting recognition area for receiving handwritten gestures as input. The display input area 124 may be a digital display area of display 120, or a non-displayed portion of display 120. The handheld computer 100 has a length defined by a top 102 and bottom 104, and a width extending between lateral sides 105, 105.

Adjacent to display 120 is an input section comprising a plurality of interactive input mechanisms for receiving user-input. Examples of interactive input mechanisms include buttons used to enter data and make selections on the handheld computer. Other examples of interactive mechanisms include scroll buttons for manipulating the output provided on display 120. Still further, input mechanisms may include joysticks, push-buttons, glide pointers, and wheel button sets.

The front panel 112 may be positioned into segments that include attachment 200. On handheld computer 100, a platform 140 is formed where attachment 200 is to be received and coupled. The platform 140 includes a pair of opposing coupling structures 145, rising vertically from platform 140. In an embodiment, each coupling structure 145 includes a rail slot 146, having a divot 148. Each divot 148 is to retain corresponding structures on attachment 200.

A plurality of conductive contacts 155, 156 are formed on platform 140. In an embodiment shown, four button contacts 155 extend a length across platform 140. A pair of scroll contacts 156 are positioned towards the middle of the four button contacts, and are distributed along a direction perpendicular to the length. The button contacts 155 and scroll contacts 156 provide actuation signals when contacted by other conductive elements, such as provided on attachment 200. Ground contacts 158 are also provided for each of the plurality of contacts 155, 156.

The attachment 200 includes a front panel surface 212 that forms the remaining portion of front panel 112 when attachment 200 is joined with handheld computer 100. When joined, front panel surface 212 is flush with the remaining portion of front panel 112 on handheld computer 100. The attachment 200 includes a first button 210, a second button 220, a scroll button 230, a third button 240, and a fourth button 250. The scroll button 230 includes a top scroll button 232 and a bottom scroll button 234. In one exemplary use, buttons 210, 220, 240 and 250 are to launch programs and make selection on entries being displayed on display 120. The scroll button 230, including top scroll button 232 and bottom scroll button 234 are to scroll what is being displayed upward and downward, respectively.

The attachment 200 includes coupling slots 245, 245, positioned to be engageable with corresponding coupling structure 145 on handheld computer 100. A shape of each coupling slot 245, 245 matches a shape of the corresponding coupling structure 145. A thickness of attachment 200 matches a distance between platform 140 and front panel 112 of handheld computer 100.

Figure 2:
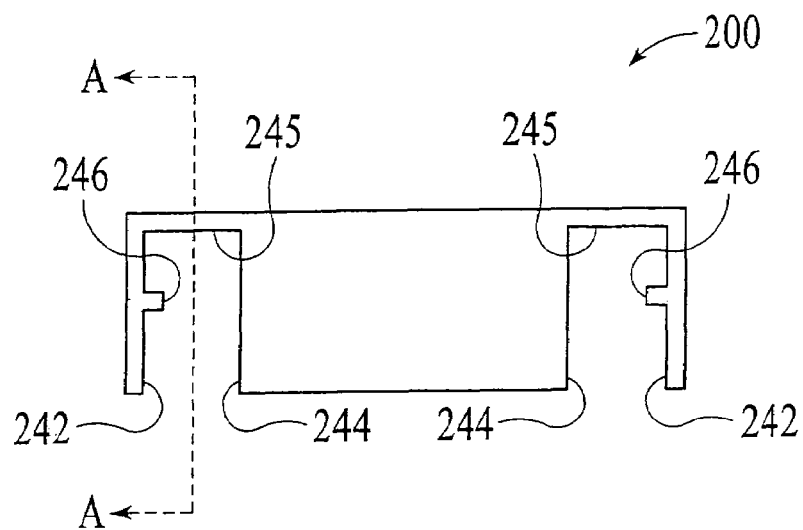
FIG. 2 is a front view of the attachment in FIG. 1, under an embodiment of the invention.

FIG. 2 is a bottom end view of removable attachment 200. As shown, each slot 245 includes an exterior lateral side 242 and an interior lateral side 244. A rail 246 extends inward from exterior lateral side 242 of each slot. Each slot 245 slideably receives coupling structure 145. The rails 246 engage rail slots 146 of handheld computer 100.

Figure 3:
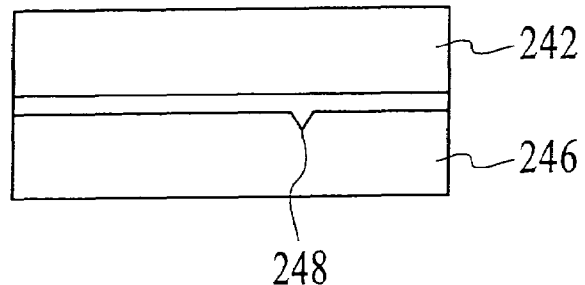
FIG. 3 is a cross-sectional view cut along lines A-A of FIG. 2, under an embodiment of the invention.

FIG. 3 is a side cross-sectional view of removable attachment 200, cut along lines A-A of FIG. 2. The rail 246 (extending from exterior lateral side 242) may include a protrusion 248 to engage divot 148 of coupling structure 145. The same construction may be used for the opposite rail 246.

In another embodiment, protrusion 248 may be replaced with a biased member or latching mechanism. For example, a latch member may extend along a portion of a length of rail 246 and at an acute angle. The latch member may be moved upwards to a biased position when engaged with rail slot 146 coupling structure 145. The latch member may return to an unbiased original position when the latch member engages divot 148.

Figure 4:
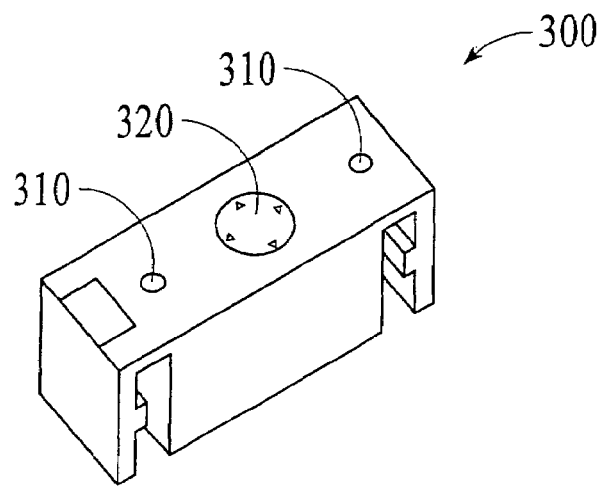
FIG. 4 is a front isometric view of an attachment carrying another set of user-input mechanisms, under an embodiment of the invention.

FIG. 4 illustrates another embodiment for a removable attachment 300. The attachment of FIG. 4 differs from previous embodiments in that the configuration of the input mechanisms now include 2 buttons 310 and a joy stick 320. The joy stick 320 may be an analog device, using scroll contacts 156 and two of the button contacts 155 on platform 140 (see FIG. 1). Alternatively, additional contacts may be provided on platform 140 for use with joystick 320.

Figure 5:
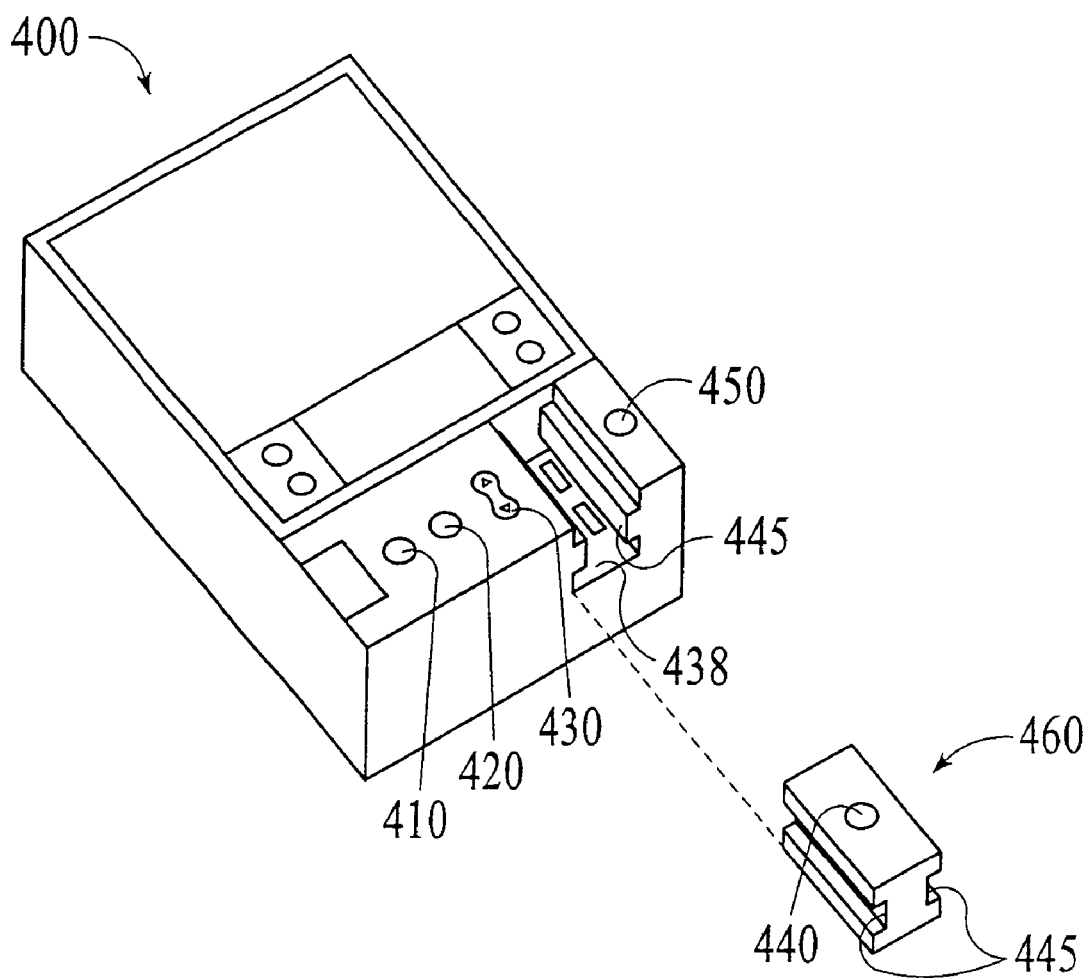
FIG. 5 is a front isometric view of a handheld computer equipped with buttons and other input mechanisms that are individually removable, under an embodiment of the invention.

FIG. 5 illustrates another embodiment in which one or more input mechanisms on handheld computer 400 are individually removable. All or select input mechanisms may be configured to be removable and interchangeable. The handheld computer 400 includes a plurality of input mechanisms, including a first button 410, second button 420, scroll buttons 430, third button 440 and fourth button 450. Each input mechanism may be provided as a removable attachment 460. In the example shown, a third button 440 is provided on an individual attachment 460. The attachment 460 is adjacent on each side to a coupling structure 445. The coupling structure 445 may use concepts described with coupling structure 145 of FIG. 1, including a rail slot and divot. The coupling structure 445 may be provided on lateral sides of adjacent input mechanisms, or on separate structures extending vertically from platform 438. For example, with third button 440, coupling structures 445 may be included on scroll button 430 and fourth button 450, or between scroll button 430 and third button 440, as well as between third button 440 and fourth button 450. Furthermore, each input mechanism that is provided as a removable attachment may include the slot 445 and rail configuration 446, shown in FIGS. 2 and 3.

C. Protocol for Removable Input Mechanisms

Embodiments of the invention include a protocol for enabling removable and interchangeable input mechanisms for use with handheld computer 100 (see FIG. 1). Reference to numerals of other figures is intended to illustrate exemplary components for use with embodiments of the invention.

In an embodiment, a protocol requires four signal lines from processing resources of handheld computer 100. The four signal lines include data, clock, power (+3V), and ground. The four signal lines may be used to enable handheld computer 100 to be compatible with digital and analog input mechanisms. As such, handheld computer 100 is provided the versatility to be operated with joy sticks and other devices that use analog values.

An input device may be coded as digital or analog. Each time one of the buttons is pressed, a "frame" is sent over the data line. The first byte of the frame uses two bits to identify the device as either analog or digital. In the example provided, digital is provided by 1,1, and analog is provided by 1,0. Further, a multi-directional analog input devices may be identified as two (and possibly more) digital input devices, with one device being equated for each of two directional axes (i.e. X and Y). Each input device identified for an analog input device signals data sequentially.

Each input device is provided an identification (ID). For analog input devices, each axis is provided an identification, as it is considered to be a separate digital input device. The contacts 155, 156 (FIG. 1) detect values for each input device. For analog input devices, the contacts may be used to associate analog values with each of the digital input devices. The analog value may be determined by internal components of the input mechanism, which convert the analog value to a digital format for the handheld computer. Alternatively, analog values may correspond to a duration over a clock cycle.

A joystick or pad that can be operated in 8 directions may include 8 analog input device ID's. Since each analog input device is defined by 2 digital input device ID's, 16 total bit are used to identify input mechanisms. The joystick or pad would require all 16 identifications for its use.

Values for digital input devices may be coded differently for analog input devices. If an input device is identified as digital, 1 bit is used to identify the value provided from the input mechanism. If an input device is identified as analog, 8 bits are used to identify the analog value for that input device.

In addition, start and stop sequences may be used to differentiate information from input devices. Each start and stop sequence may be composed of the first 2 bits in the first byte signaled with the frame. In the example provided, the start and stop sequence is in the form of 1,0. When the start and stop sequence is encountered, the processing resources of handheld computer 100 identify the next sequence as a new input device. For a joystick, that may correspond to a different axis of the existing joystick position, or a new position for the joystick.

Figure 6:
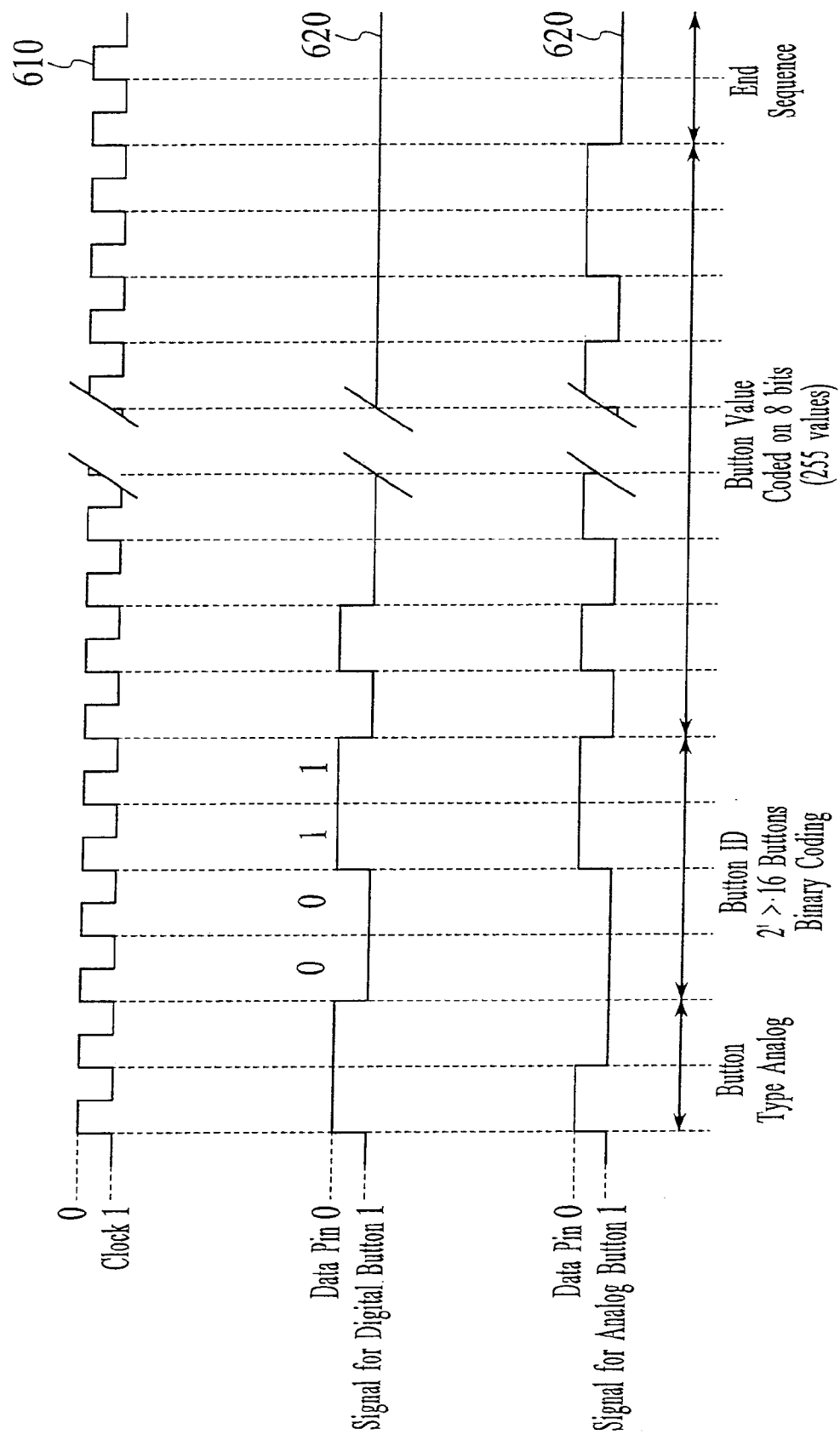
FIG. 6 is a timing diagram for operating digital and analog input mechanisms with a handheld computer, under an embodiment of the invention.

FIG. 6 is a signal diagram illustrating processing values from a digital input device and an analog input device. A clock signal 610 provides a differentiating signal for use with identifying the input device on the data line. The diagram illustrates a frame signaled when one of the input mechanisms is actuated. The frame includes a frame start sequence, button type, button identifier, button value and frame end sequence. A data pin signal 620 carries the frame when the input mechanism is actuated. In a first 2-bit sequence, the type of input device is identified (1,1 for digital; 1,0 for analog).

A subsequent 4-bit signal identifies the input device. If the input device is a digital type, the ID may identify its position on the platform 140 of handheld computer 100 (FIG. 1). For example, the ID may identify its position on conductive contacts 155, 156 of platform 140 (see FIG. 1). The next bit is the digital value of that input device, shown to be 0. Each input mechanism (button, joystick etc.) includes hardware to signal the input mechanism's identification with the frame upon being actuated. The hardware for each input mechanism may also be used to identify the mechanism's type and its value when actuated.

If the input device is analog, the ID may identify a directional component. For example, for an 8-directional joystick, analog IDs may be assigned according to, for example, a configuration in which north=1, north-east=2, east=3, south-0 east=4 etc. The digital input device ID may provide a value for the east direction of a joystick movement. For example, with the digital input device=3, the subsequent analog value may be for the east component, in instances when the analog ID of the joystick may be 2, 3 or 4. The analog value is assigned the next 8-bits of the clock cycle. In one embodiment, the analog input mechanism includes hardware for determining an analog value when actuated. The hardware includes an analog-digital converter to signal the analog value in digital format to the processing resources 710 see FIG. 1 of the handheld computer.

D. Overlaid Input Mechanisms

Embodiments of the invention may provide for a device including one or more input mechanisms that can be mounted over existing input mechanisms of a handheld computer 700. The device may provide a new configuration for an input mechanism. For example, the new configuration may reposition input mechanisms for the handheld computer, alter the number of input mechanisms, and/or change the nature of one or more of the input mechanisms.

Figure 7:
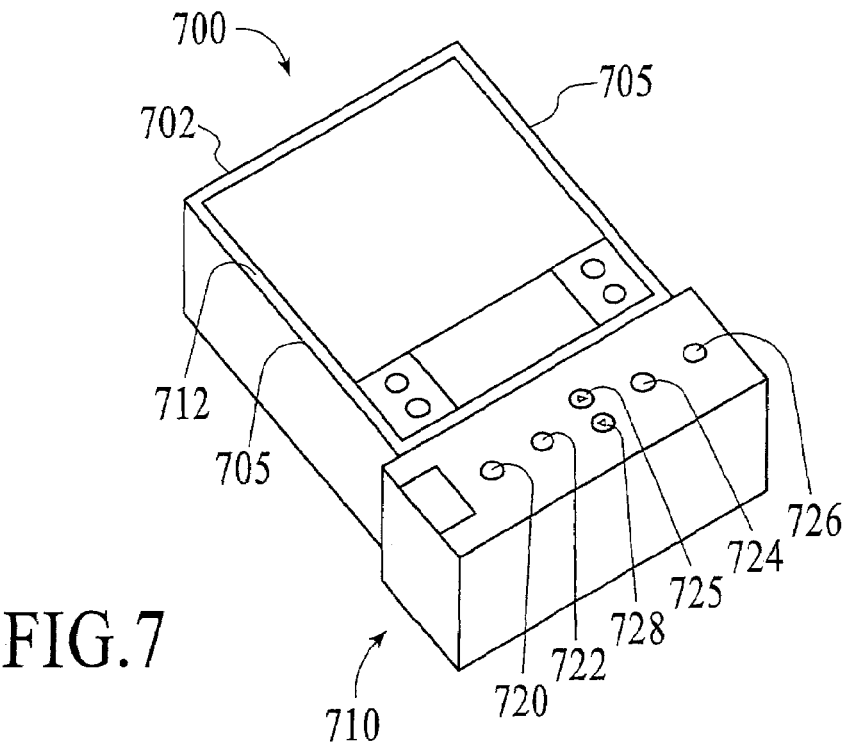
FIG. 7 is a front isometric view of an attachable device providing user-input mechanisms overlaid onto a handheld computer with existing user-input mechanisms, under an embodiment of the invention.

FIG. 7 illustrates handheld computer 700 coupled to an attachable device 710. The handheld computer 700 includes a top 702, a bottom and opposing lateral sides 705. The device 710 includes a plurality of input mechanisms, including buttons 720, 722, 724 and 726, a first scroll button 725 and a second scroll button 728. The input mechanisms of device 710 may defer from the existing input mechanisms by, for example, size of the buttons 720-726, or positioning of the buttons relative one another or relative to a front panel 712 of handheld computer 700.

Figure 8:
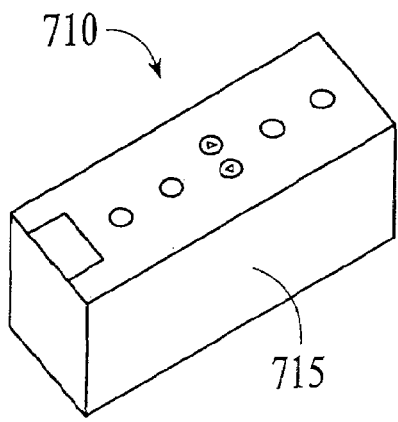
FIG. 8 is a front isometric view of the attachable device in FIG. 7, under an embodiment of the invention.
Figure 9:
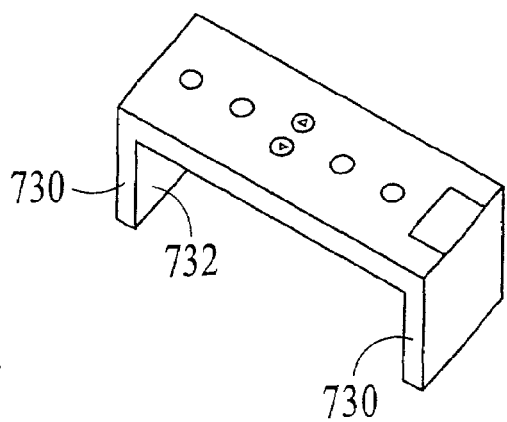
FIG. 9 is a back view of the attachable device in FIG. 7, under an embodiment of the invention.

FIGS. 8 and 9 illustrates the device 710 decoupled from handheld computer 700. A bottom end 715 is encases the bottom of handheld computer 700. With reference to FIG. 9, a pair of side-walls 730 slideably engage corresponding lateral sides 705 of handheld computer 700. A latch mechanism or coupling structure (such as shown by FIGS. 2-4) may be incorporated into the lateral side 705 and interior sides 732 of side-walls 730.

Figure 10:
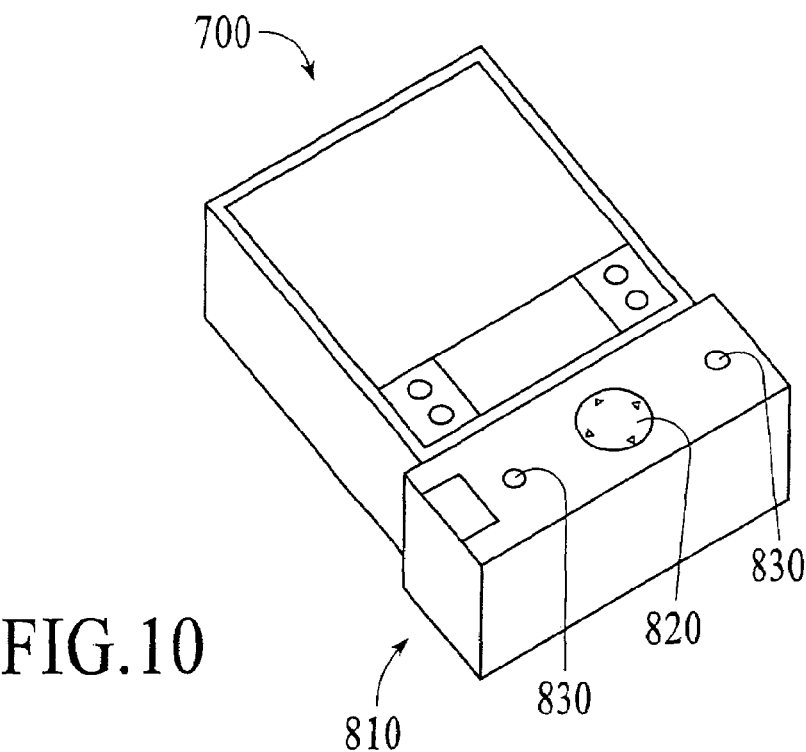
FIG. 10 is a front isometric view of an other attachable device providing user-input mechanisms, including a multi-directional control, overlaid onto a handheld computer with existing user-input mechanisms, under an embodiment of the invention.

FIG. 10 illustrates handheld computer 700 with an attachable device 810 for providing a joy pad 820 and buttons 830. In an embodiment, joy pad 820 may use adjacent buttons 720 and scroll buttons 725 and 728. An example of how joy pad 820 may be integrated to cooperate with the existing input mechanisms of handheld computer 7800 is provided with FIG. 11.

Figure 11:
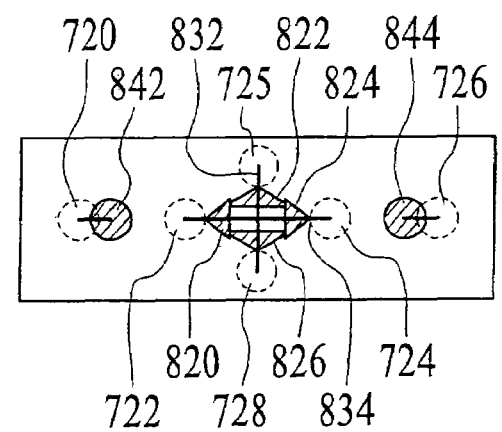
FIG. 11 is a top view of an attachable device overlaid onto existing input mechanisms of a handheld computer, where the attachable device includes a multi-directional pad, under an embodiment of the invention.

FIG. 11 illustrates an embodiment in which joy pad 820 is overlaid on input mechanisms for handheld computer 700, including first button 720, second button 722, third button 724, fourth button 726, first scroll buttons 725 and second scroll buttons 728. The joy pad 820 is provided a first (north) directional button 822, a second (east) directional button 824, a third (south) directional button 826, and a fourth (west) directional button 828. A first pivotal member 832 extends between the first button 822 and the third button 826. The first pivotal member 832 also extends over the first scroll button 725 and second scroll button 728 of handheld computer 700 A second pivotal member 834 extends between the second button 824 and the fourth button 828. The second pivotal member 834 also overlays second button 722 and third button 724.

The directional buttons 822-828 can be pressed individually or in pairs to create 8 possible directions. Each button 822-828 being pressed causes one of the corresponding pivotal members 832, 834 to pivot downward in one of two positions. When pivoted downward, the pivotal members 832, 834 contact and cause one of the two corresponding input mechanisms on handheld computer 700 to be pressed.

In an example provided by FIG. 11, first directional button 822 pivots first member 832 into first scroll button 725. The third directional button 826 pivots first member 832 into second scroll button 728. The second directional button 824 pivots second member 834 into third button 724 of handheld computer 700. The fourth directional button 828 pivots second member 834 into second button 722 on handheld computer 700.

The combination of the first directional button 822 and second directional button 824 being pressed (for north east direction) causes first member 832 to pivot into first scroll button 725, and second member 834 to pivot into third button 724. The combination of the second directional button 822 and third directional button 824 being pressed (for south east direction) causes first member 832 to pivot into second scroll button 728, and second member 834 to pivot into third button 724. The combination of the third directional button 824 and fourth directional button 826 being pressed (for south west direction) causes first member 832 to pivot into second scroll button 728, and second member 834 to pivot into second button 722. The combination of the first directional button 822 and fourth directional button 828 being pressed (for south west direction) causes first member 832 to pivot into first scroll button 725, and second member 834 to pivot into second button 722.

Figure 12:
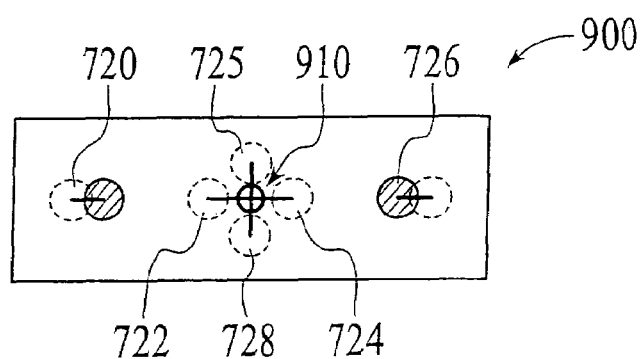
FIG. 12 is a top view of an attachable device overlaid onto existing input mechanisms of a handheld computer, where the attachable device includes a multi-directional member, under an embodiment of the invention.

FIG. 12 illustrates another embodiment in which a joy stick 910 is provided on device 900. Similar to an embodiment with device 800, device 900 is detachable coupleable to a bottom of handheld computer 700. The joy stick 910 is a member extending orthanormally from front panel 712 of handheld computer 700.

In an embodiment, joy stick 910 is coupled to first directional members 832 and second directional members 834. As described with FIG. 11, joy stick 910 may be provided 8 directions of movement, each corresponding to one or two of the input mechanisms on handheld computer 700 being inserted.

The handheld computer 700 may be configured through programming to distinguish inputs where buttons 720-726 are pressed simultaneously with first scroll button 725 or second scroll button 728. In particular, handheld computer 700 may be configured through programming to interpret simultaneous insertion of one of the buttons 720-726 with one of the scroll buttons 725, 728 in a manner described with FIG. 6 and the accompanying disclosure.

E. Other Embodiments

Figure 13:
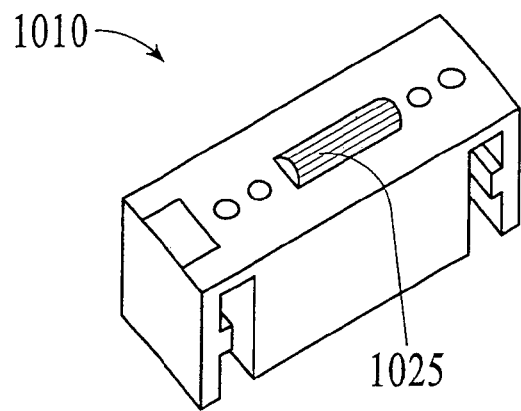
FIG. 13 is a front isometric view of an attachable device for a handheld computer, the attachable device including an analog wheel input mechanism, under an embodiment of the invention.

FIG. 13 illustrates another embodiment including an attachable device 1010 coupleable to handheld computer 100 (FIG. 1). The attachable device 1010 includes a two-directional analog control, called a wheel 1025. The wheel 1025 is moveable upwards and downwards to cause handheld computer 100 to reconfigure or alter the display 120 (FIG. 1). An analog value off wheel 1025 ma be associated with its rotation by the user.

Figure 14:
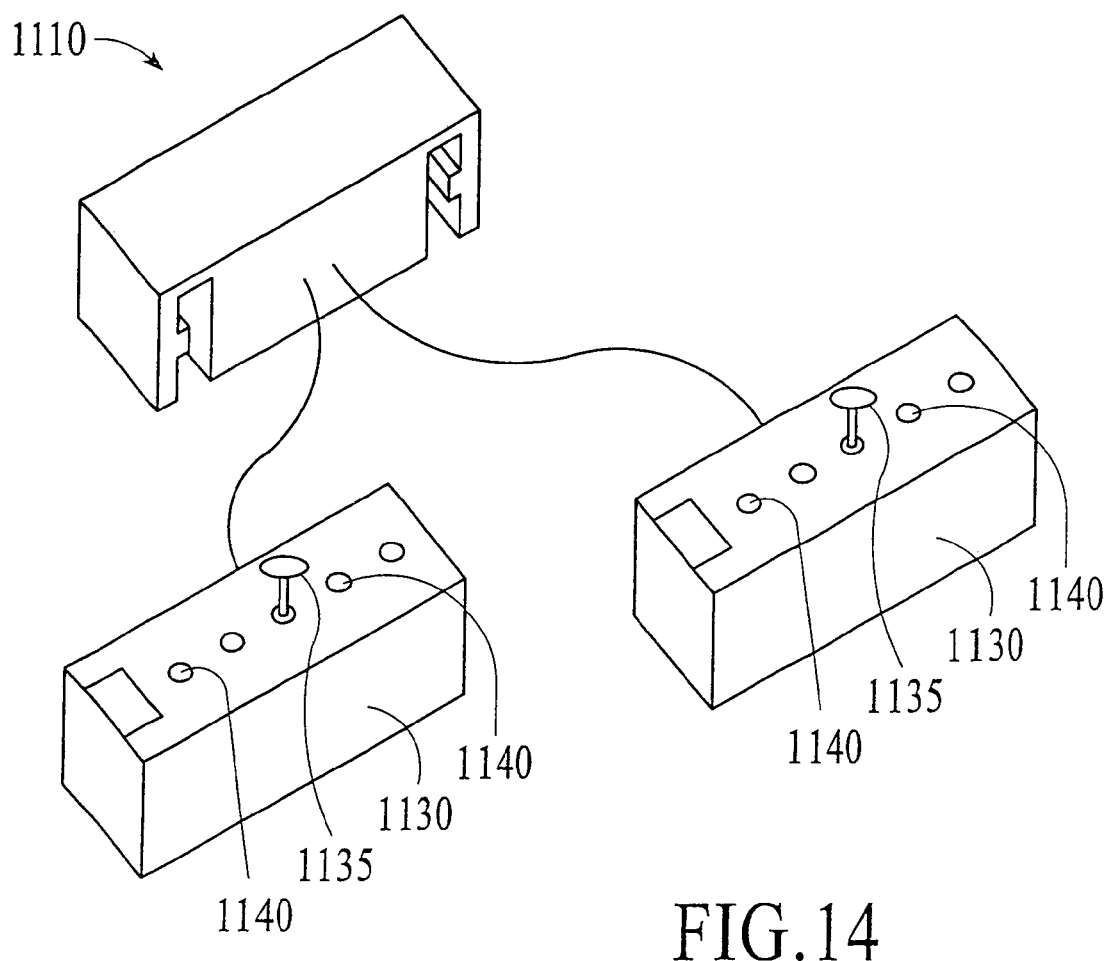
FIG. 14 is a front isometric view of an attachable device for a handheld computer, the attachable device including a splitter coupled to two multi-directional input mechanisms, under an embodiment of the invention.

FIG. 14 illustrates another embodiment including an attachable device 1110 coupleable to handheld computer 100 (FIG. 1). The attachable device 1110 includes an internal splitter to enable to control devices 1130 to be extended from it. Each control device 1130 includes an multi-directional analog control—the joystick 1135, and digital buttons 1140. The control devices 1130 may be used for playing games with two players. A protocol for the device 1110 may be established to enable one control 1130 to be active at a time. Each control 130 may be coupled to contacts 155, 156 on platform 140 (FIG. 1).

F. CONCLUSION

The foregoing description of various embodiments of the invention has been presented for purposes of illustration and description. It is not intended to limit the invention to the precise forms disclosed. Many modifications and equivalent arrangements will be apparent.

What is claimed is:

1. A portable computer comprising:
   a processor;
   a housing including a front panel on which a platform is provided;
   a plurality of contacts provided on the platform; and
   a multi-directional input mechanism comprising a plurality of components, wherein the multi-directional input mechanism is configured to be engaged with the housing so as to be slideably re-insertable into an operative position and slideably removable from engagement with the housing;
   wherein (i) when in the operative position with respect to the platform, each of the plurality of components overlays at least one of the plurality of contacts, and (ii) when each component in the plurality of components is pressed, the one or more contacts, that the component overlays, signal a corresponding input that is received by the processor; wherein the plurality of contacts include at least a set of four contacts distributed on the platform, wherein the set is distributed linearly in a first direction extending across the platform.

2. The portable computer of claim 1, further comprising a display provided on the front panel of the housing.

3. The portable computer of claim 2, wherein the display is positioned relative to the front panel to be apart from a portion of the front panel that overlays the platform.

4. The portable computer of claim 1, further comprising an input member that extends from the front panel and is moveable in a plurality of directions to cause an input to be processed by the processor, wherein the input of the input member corresponds to a direction in which the member is moved.

5. A portable computer comprising:
   a processor;
   a housing including a front panel on which a platform is provided;
   a plurality of contacts provided on the platform;
   a multi-directional input mechanism comprising a plurality of components, wherein the multi-directional input mechanism is configured to be engaged with the housing so as to be slideably re-insertable into an operative position and slideably removable from engagement with the housing; and
   wherein (i) when operatively positioned on the platform, each of the plurality of components overlays at least one of the plurality of contacts, and (ii) when each component in the plurality of components is pressed, the one or more contacts, that the component overlays, signal a corresponding input that is received by the processor;

a contact-sensitive display provided apart from the platform on the front panel of the housing;

wherein the multi-directional input mechanism overlays at least a portion of the contact-sensitive display.

6. The portable computer of claim 5, wherein the multi-directional input mechanism further comprises a mechanism that overlays the contact-sensitive display and is pressable to cause a contact with the display that signals an analog input to the processor.

7. The portable computer of claim 5, wherein the multi-directional input mechanism corresponds to a joypad.

* * * * *